(No Model.) 2 Sheets—Sheet 1.

B. HOLT.
TRACTION ENGINE.

No. 499,114. Patented June 6, 1893.

Witnesses:

Inventor,
Benjamin Holt.
By Dewey & Co.
Attys (No Model.) 2 Sheets—Sheet 2.

B. HOLT.
TRACTION ENGINE.

No. 499,114. Patented June 6, 1893.

Witnesses:

Inventor,
Benjamin Holt.
By Dewey & Co.
Attys.

UNITED STATES PATENT OFFICE.

BENJAMIN HOLT, OF STOCKTON, CALIFORNIA.

TRACTION-ENGINE.

SPECIFICATION forming part of Letters Patent No. 499,114, dated June 6, 1893.

Application filed February 23, 1893. Serial No. 463,439. (No model.)

*To all whom it may concern:*

Be it known that I, BENJAMIN HOLT, a citizen of the United States, residing at Stockton, San Joaquin county, State of California, have invented an Improvement in Traction-Engines; and I hereby declare the following to be a full, clear, and exact description of the same.

My invention relates to improvements in traction engines, and it consists in the attachment of a supplemental vertically adjustable frame, with supplemental traction wheels journaled therein exterior to the main frame and main traction wheels for the purpose of increasing the bearing surface on soft ground.

It also consists in certain details of construction which will be more fully explained by reference to the accompanying drawings, in which—

Figure 1:
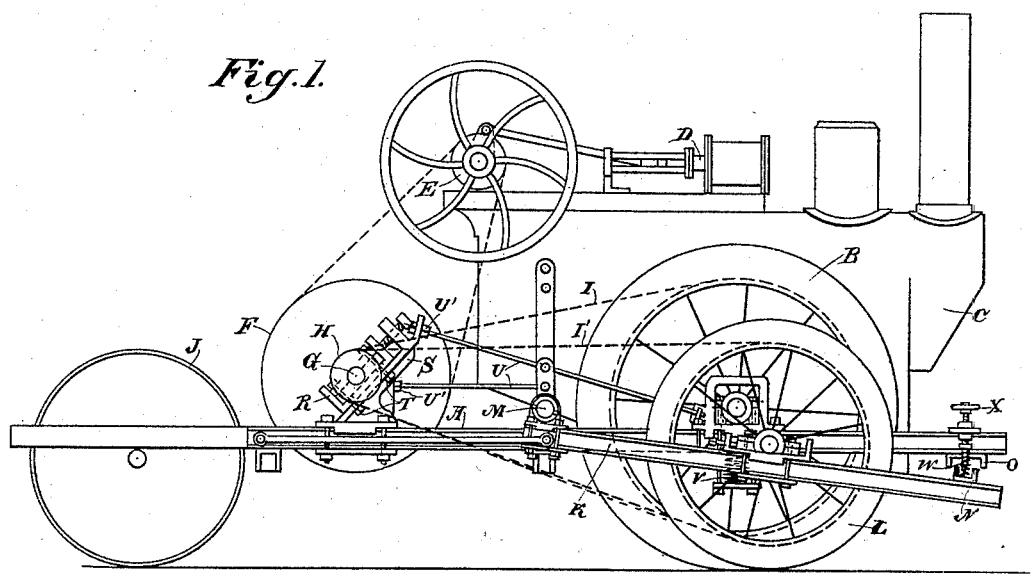
Figure 2:
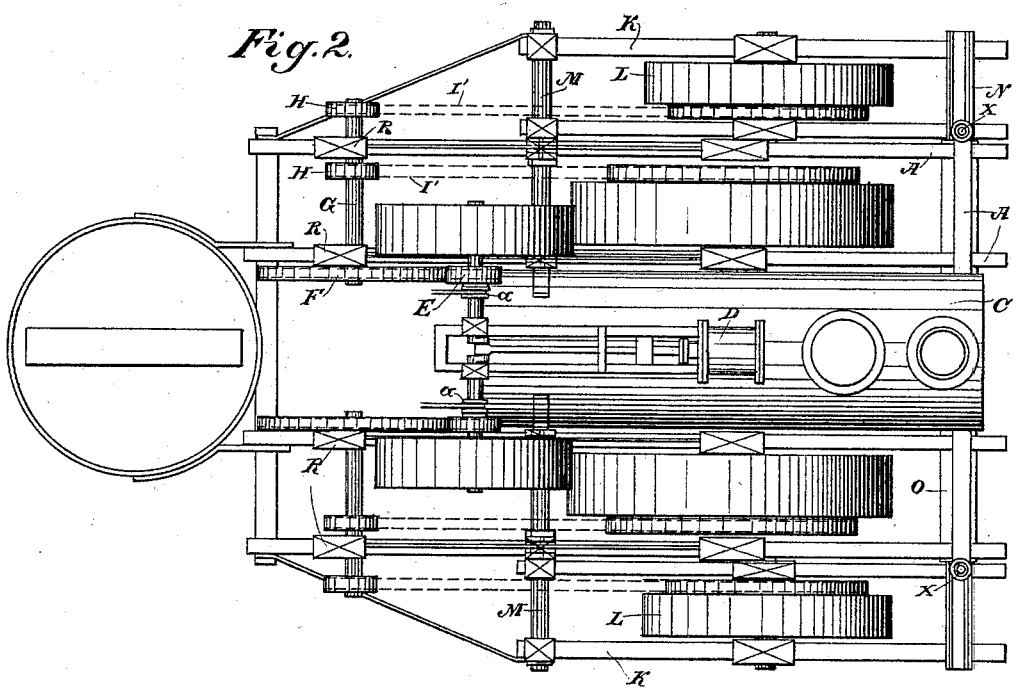
Figure 3:
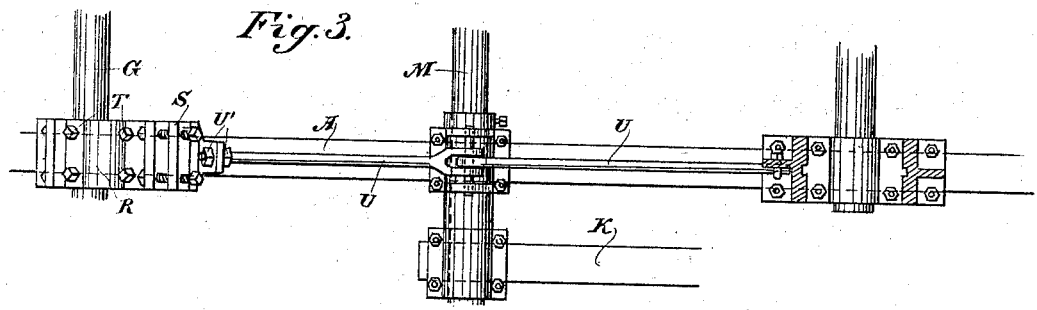
Figure 4:
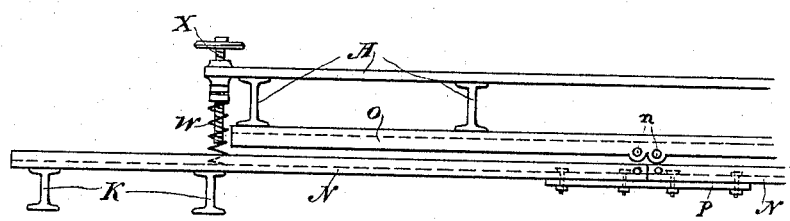
Figure 5:
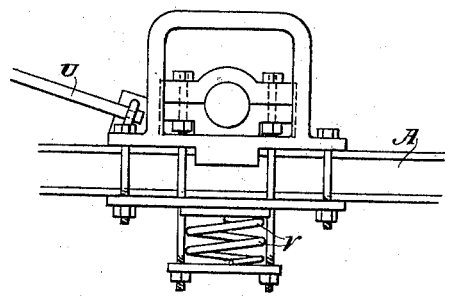

Figure 1 is a side elevation of a traction engine showing my improvements. Fig. 2 is a plan view. Fig. 3 is a partial plan view of the main frame and connections. Fig. 4 is a rear end view of the same. Fig. 5 is a detail view of a box of the main bearing wheels.

The object of my invention is to provide supplemental wheels journaled in frames exterior to the main frame, said frames being movable vertically, with relation to the main frame, whereby the supplemental wheels adjust themselves to inequalities of the ground, and when soft ground is encountered into which the main wheels sink to a greater depth than is desirable, the upward movement of the supplemental frames is arrested, so that the weight of the main frame is brought to bear upon the supplemental frame, and its wheels support a portion of the weight of the machine.

In the drawings I have shown so much of a traction engine as is necessary to illustrate my improvements.

A is the main frame of the engine supported upon the bearing and traction wheels B, suitably journaled to the frame.

C is the boiler of the engine having mounted in any suitable connection therewith the engine D from which power is transmitted to the engine shaft, upon which is mounted the driving sprocket-wheel E, and from this, power is transmitted to a sprocket-wheel or wheels F mounted upon the counter-shafts G. Upon these shafts are mounted the sprocket-wheels H H' from which driving chains extend to the sprocket-wheels I I' upon the shafts of or attached to the main and supplemental bearing wheels B and L, so that power is transmitted in this manner from the engine to drive the main and supplemental traction wheels and propel the engine.

The steering wheel J is suitably journaled at the front of the machine, and has connected with it means (not here shown) by which it may be turned from side to side.

By means of clutch mechanism a, of any suitable construction, on the engine shaft, power is transmitted to the two counter-shafts G, either simultaneously or independently, and both shafts may be driven at the same time, and power transmitted through the chains to the bearing and supplemental wheels, or by disengaging one frictional or clutch mechanism, the parts connected with the counter-shaft G on that side will become stationary, and the parts on the opposite side will be driven so as to turn the engine in a very small space.

K K are supplemental frames of sufficient size to admit the supplemental traction wheels L which are journaled in these frames. The front ends of the frames K are fulcrumed upon stout shafts M, supported from the main frame A of the engine, so that the rear ends of the supplemental frames may rise and fall in vertical planes about these fulcrum points.

The supplemental bearing wheels L are of smaller diameter than the main bearing wheels B, or the supplemental frames K are so arranged that the rear ends of these frames lie below the horizontal plane of the main frame A.

Across the rear ends of the frame K extend the bars N which are fixed to the frames K and pass beneath the frame A.

When traveling upon level ground, it will be manifest that as the rear ends of the frames K are lower than the frames A, the wheels L will travel upon the ground, and will be free to move up and down within certain limits, and thus follow any irregularities of the surface; but if the main wheels B should sink into the ground by reason of its being soft, the wheels L will then be forced up until the transverse bars N are brought into contact with the lower surfaces of the main frames A, when the latter will be supported by the wheels L as well as the wheels B, and the bearing surfaces for the engines will thus be correspondingly increased. It will be manifest that these transverse beams N may be made of wood or any suitable material. In the present case I have shown them made of channel iron with the concave sides uppermost, and beneath the beams A I have fixed corresponding channel iron beams O, the concave sides of which are presented downward and the opening or channel is of sufficient width in these beams to allow the beams N to enter into the channel of the beam O as shown, so that when the bearing is brought upon both sets of wheels, these beams are very firmly locked together, and the whole frame presents practically a single structure.

The beam N is made in two parts separated in the center, and the two inner ends are pivoted or hinged within the beam o as shown at n, so that they may move independently with the varying movements of the supplemental wheels. If it is desired, the two parts may be secured together by means of a bar or bars P, extending transversely across the meeting ends and bolted thereto so that they will move in unison, and the outer ends of either or both these beams may be secured to the transverse beam O by means of bolts Q which are passed through holes in the two beams, the holes corresponding and being in line with each other for this purpose. The beams will then be rigidly fixed to the main frame. The shafts G upon which the sprocket-wheels H and F are secured, are journaled in boxes, which are mounted upon angular brackets S fixed to the main frame A. These brackets are essentially triangular in form, as shown, and they are bolted to the frame A with one side downward. The other two sides are presented upwardly, and the boxes R are secured upon the side which is farthest from the bearing-wheel shafts, as shown, by bolts passing through slots in the brackets, so that the boxes may be moved up or down, as desired, by means of screws T. The object of this construction is to enable the chains extending from the sprocket-wheels E to the sprocket-wheels F, and also the chains extending from the sprocket-wheels H to the sprocket-wheels I, and those extending from the sprocket-wheel H' to the sprocket-wheels I' by which the supplemental bearing wheels L are driven, to be simultaneously or independently tightened, when necessary, which is done by moving the boxes R down the inclined surface of the brackets to which they are secured, and this moves the shaft G outwardly from the engine shaft and also, at the same time, outwardly from the shafts of the main and supplemental bearing wheels.

If the chains extending to the main or supplemental bearing wheel sprockets need to be tightened independently of the others, it is done by moving the bracket supports S upon the side frames A by loosening the holding bolts. After the brackets have been adjusted, they are secured, and are firmly braced by jointed brace rods U extending between the brackets and the wheel shaft boxes as shown. By means of nuts U' any desired pressure against the brackets and boxes may be obtained. By this construction, if the outside supplemental bearing wheels pass over hollow places in the ground surface, while the main bearing wheels remain upon a comparatively level surface, these exterior wheels are free to drop away from the main frame by reason of their independently hinged supporting frames K, and whatever power they can add toward driving the engine will then depend upon the weight of these wheels and their frames. If, however, these wheels pass over higher places than the main wheels, or if the engine sinks into soft ground, these wheels will be forced up until the beams N come into contact with the main frame A, when the latter and the weight of the engine will be partially supported upon these wheels in conjunction with the main bearing wheels, and then the power applied to these wheels will be increased in proportion to the additional weight which is brought upon them, thus enabling the engine to help itself out of bad places as well as giving it a much greater support in soft ground than could otherwise be effected. In order to prevent sudden shocks when the bearing parts are thus brought into contact, I employ stout springs V which are fitted beneath the bearing boxes of the main wheel shafts, and springs W at points where the main and supplemental frames come in contact. These springs relieve the parts from sudden shocks, and their tension is adjusted by screws X to any desired degree, so that the contact of the transverse beam with the main frame is made easily and the transfer of weight to the supplemental wheel frame is made gradually.

Having thus described my invention, what I claim as new, and desire to secure by Letters Patent, is—

1. In a traction engine, the main frame and bearing wheels upon which it is supported, in combination with supplemental frames hinged to the main frame and movable with relation thereto, and having supplemental wheels independently journaled therein whereby said wheels have a free vertical movement to conform to the irregularities of the ground surface, and means comprising a transverse connection below the main frame for connecting the supplemental frames with the main frame when the wheels of the latter sink into the surface whereby all the wheels act to support the mechanism, substantially as herein described.

2. In a traction engine, a main frame and bearing and traction wheels journaled thereto, supplemental frames having their front ends hinged to the main frame upon opposite sides, with the rear ends free to move, supplemental wheels journaled in the supplemental frames, a transverse bar connecting the movable ends of the supplemental frames and extending beneath the main frame, whereby a portion of the weight of the latter is supported upon the supplemental wheels whenever the main bearing wheels sink below the surface of the ground, substantially as herein described.

3. In a traction engine, the main frame with bearing and traction wheels, supplemental frames having one end of each hinged upon opposite sides of the main frame, and the opposite ends movable with relation thereto, supplemental wheels journaled in these frames, a transverse bar connecting the movable ends of the supplemental frames and extending with relation to the main frame, so that the latter is partially supported by the supplemental wheels, when the main wheels sink into the surface of the ground, the engine and mechanism for transmitting the power of the engine to the main and supplemental bearing wheels whereby both sets of wheels act to drive the machine, substantially as described.

4. A traction engine consisting of a main frame with bearing and traction wheels, supplemental frames hinged upon opposite sides of the main frame, with supplemental wheels journaled thereto and movable independently of the main frame means whereby the weight of the main frame is partially supported upon the supplemental wheels when the main wheels sink into the surface, a driving mechanism whereby power is transmitted from the engine to the main and supplemental bearing wheels on one side, independently of the wheels on the opposite side, and both sets of wheels serve to propel the engine, substantially as herein described.

5. In a traction engine, the main frame and bearing and traction wheels, supplemental frames connected with and movable with relation to the main frame and having supplemental bearing and traction wheels journaled therein, means by which the supplemental frames are locked to the main frame whereby a portion of the weight of the latter is brought upon the supplemental wheels when the main wheels sink below the surface of the ground, independent sprocket wheels and chains whereby motion is transmitted from the engine shaft to counter-shafts, and from the counter-shafts to the traction wheels, boxes in which said counter-shafts are journaled, inclined supports upon which said boxes are movable with relation to the engine shaft, and the bearing wheel shafts whereby the tension of both sets of chains is increased or diminished simultaneously, substantially as herein described.

6. In a traction engine, the main frame and bearing and traction wheels whereby it is supported, supplemental frames connected with the main frame and vertically movable with relation thereto, supplemental wheels journaled in said frames, a means whereby the supplemental frames are locked to the main frame, and a portion of the weight of the latter is supported thereon when the main bearing wheels sink below the surface of the ground, sprocket-wheels upon the engine shaft, and counter-shafts through which motion is transmitted independently from the engine shaft to the main and supplemental bearing wheels, boxes movable upon inclined supporting brackets whereby the chains from the engine shaft to the counter-shaft, and from the traction wheels to the counter-shaft are simultaneously adjusted, and independent adjustments for the bearing traction wheels, consisting of boxes movable horizontally upon the framework, and screws by which they are moved, substantially as herein described.

7. In a traction engine, the main frame and bearing and traction wheels journaled therein, the supplemental frames movably connected with the main frame having supplemental wheels journaled therein, with mechanism intermediate between the engine shaft and traction wheels whereby power is transmitted to move the main and supplemental traction wheels independently, transverse bars connecting the movable ends of the supplemental frames, a means whereby said bars are locked to each other or independently hinged to the main frame, substantially as herein described.

8. In a traction engine, the main frame and bearing and traction wheels journaled thereon, supplemental frames movably connected with the main frame having supplemental wheels journaled thereon with the described intermediate mechanism between the engine shaft and the traction wheels, whereby the wheels upon one side are driven or stopped independently of those upon the opposite side, substantially as herein described.

9. In a traction engine, the main frame and bearing and traction wheels journaled thereon, supplemental frames movably connected with the main frame having supplemental wheels journaled thereon, and means whereby a part of the weight of the main frame is transferred to the supplemental wheels, an engine, engine shaft, and sprocket-wheels with chains through which power is transmitted to independent counter-shafts, sprocket-wheels and chains whereby power is transmitted to the main and supplemental wheels, and journal-boxes independently adjustable, whereby the tension of either set of chains may be separately regulated, substantially as herein described.

10. In a traction engine, main and supplemental frames movably connected with each other, each having sets of bearing and traction wheels independently journaled upon them, and means whereby the weight of the engine may be transferred from one set of wheels to the other, independent counter-shafts clutch mechanism, sprocket-wheels and chains whereby the wheels upon one side are driven independently of those upon the other side, journal-boxes independently adjustable with relation to each other, and adjustable brace rods extending between the boxes, substantially as herein described.

11. In a traction engine, main and supplemental frames connected and movable with relation to each other, each having sets of bearing and traction wheels journaled upon them, means whereby the frames are brought together to act in unison, and divide the weight between the sets of wheels, and springs interposed between the contact and bearing points of the two frames whereby the transfer of weight is effected gradually, substantially as herein described.

12. In a traction engine, a main frame and supplemental frames having one end of each hinged thereto on opposite sides, and the other ends vertically and independently movable, main and supplemental wheels independently journaled in the frames, means whereby the independent movements of the two sets of frames are arrested, and the weight of the machine is supported upon both sets of wheels, springs interposed between the frames at their contact and bearing points, and springs between the journal-boxes of the main bearing wheels and the main frame, substantially as herein described.

In witness whereof I have hereunto set my hand.

BENJAMIN HOLT.

Witnesses:
E. L. WILHOIT,
C. E. LITTLEHOLE.